US012731612B2

(12) United States Patent
Baird et al.

(10) Patent No.: US 12,731,612 B2
(45) Date of Patent: Sep. 8, 2026

(54) CAMERA-GUIDED RETRIEVAL ASSEMBLY FOR USE WITHIN MEDIA LIBRARY

(71) Applicant: QUANTUM CORPORATION, San Jose, CA (US)

(72) Inventors: Michael R. Baird, Highlands Ranch, CO (US); Jesse Baker, Sheridan, CO (US)

(73) Assignee: Quantum Corporation, Centennial, CO (US)

( * ) Notice: Subject to any disclaimer, the term of this patent is extended or adjusted under 35 U.S.C. 154(b) by 0 days.

(21) Appl. No.: 18/584,341

(22) Filed: Feb. 22, 2024

(65) Prior Publication Data

US 2025/0273241 A1 Aug. 28, 2025

(51) Int. Cl.
*G11B 15/68* (2006.01)
*H04N 23/56* (2023.01)

(52) U.S. Cl.
CPC ........ *G11B 15/689* (2013.01); *G11B 15/6835* (2013.01); *H04N 23/56* (2023.01)

(58) Field of Classification Search
None
See application file for complete search history.

(56) References Cited

U.S. PATENT DOCUMENTS 5,287,414 A * 2/1994 Foster ................ G06K 17/0006 235/383
5,337,297 A * 8/1994 Kvifte .................... G11B 17/30 360/92.1
5,442,500 A * 8/1995 Hidano .............. G11B 23/0236
5,498,116 A * 3/1996 Woodruff ............. G11B 15/688 360/92.1
6,618,348 B1 * 9/2003 Coffin .................. G11B 17/225
6,813,113 B1 * 11/2004 Mueller ............... G11B 17/225 360/92.1
6,900,960 B2 * 5/2005 Gariepy ............. G11B 15/6835 369/30.43
7,472,405 B2 * 12/2008 Pierce ................ G11B 15/6835 369/30.43
7,777,986 B2 * 8/2010 Barkley ............. G11B 15/6835 360/92.1
9,601,150 B1 * 3/2017 Todd .................... G11B 15/675

(Continued)

*Primary Examiner* — Fred Tzeng
(74) *Attorney, Agent, or Firm* — Haris Z. Bajwa

(57) ABSTRACT

A media library (10) includes a storage slot (218), a first target (218), a retrieval assembly (224), and a control system (260). The storage slot (218) is configured to receive and retain a media cartridge (20). The first target (250) is coupled to the storage slot (218). The retrieval assembly (224) is configured to move the media cartridge (20) into and out of the storage slot (218). The retrieval assembly (224) includes an assembly body (224A), an image capturing apparatus (246) that is coupled to the assembly body (224A), and a second target (248) that is coupled to the assembly body (224A). The control system (260) includes a processor that is configured to control operation of the retrieval assembly (224). When the retrieval assembly (224) is positioned near the storage slot (218), the image capturing apparatus (246) has a field of view (452) that captures both the first target (250) and the second target (248). The control system (260) is configured to calculate an offset (454) between the first target (250) and the second target (248) within the field of view (452) along at least one axis.

10 Claims, 6 Drawing Sheets

(56) References Cited

U.S. PATENT DOCUMENTS

| | | | | | |
|---|---|---|---|---|---|
| 11,023,174 | B2 * | 6/2021 | Goodman | G06F 3/0607 | |
| 2005/0122616 | A1 * | 6/2005 | Hoelsaeter | G11B 5/86 | 360/92.1 |
| 2005/0162775 | A1 * | 7/2005 | Ojima | G11B 15/6835 | 360/92.1 |
| 2008/0043366 | A1 * | 2/2008 | Starr | G11B 15/6835 | 360/92.1 |
| 2011/0106299 | A1 * | 5/2011 | Inagaki | G11B 15/6835 | 235/375 |
| 2012/0237321 | A1 * | 9/2012 | Akiyama | G11B 17/225 | 414/222.02 |

* cited by examiner

CAMERA-GUIDED RETRIEVAL ASSEMBLY FOR USE WITHIN MEDIA LIBRARY

BACKGROUND

Automated media library systems (or "media libraries"), such as automated tape library systems (or "tape libraries"), are commonly utilized for purposes of writing data to and reading data from media cartridges, such as magnetic tape cartridges. Magnetic tape cartridges are configured to retain and/or store magnetic tape that can be used in a magnetic tape drive for purposes of writing data to and reading data from the magnetic tape. Magnetic tape cartridges have been used extensively because they provide a convenient way to house and support a length of magnetic tape for engagement by a transducer (or tape head, sometimes referred to as a "head") in the magnetic tape drive while protecting the magnetic tape upon removal of the tape cartridge. Moreover, magnetic tape cartridges facilitate economic and compact storage of data. During use of the magnetic tape drive, a tape head of the magnetic tape drive is configured to be in direct contact with the magnetic tape from the magnetic tape cartridge so that data can be written to and read from the magnetic tape as the magnetic tape moves across the tape head, often at high speed. Such tape heads can include dedicated write heads, dedicated read heads, or combination read/write heads.

The magnetic tape cartridges are received and retained (and stored) within storage slots of the tape library when not being used for purposes of writing data to and/or reading data from the magnetic tape. In various embodiments, the tape library can include a plurality of storage slots that are incorporated within one or more magazines. In some such embodiments, the tape library can include a plurality of magazines that can have any suitable positioning within the tape library relative to each other and relative to other components of the tape library. When it is desired to perform a write operation and/or a read operation on the magnetic tape within a given tape cartridge, such as upon request of a user or host application, a tape cartridge retrieval assembly (also referred to herein as a "retrieval assembly") of the tape library is usable to retrieve the tape cartridge and move the tape cartridge between the storage slot and a tape drive of the tape library. Upon completion of the desired write operation and/or read operation, the retrieval assembly can then return the tape cartridge to an appropriate storage slot.

Unfortunately, in a given tape library, especially a large tape library with thousands of storage slots, mechanical tolerances can accumulate and introduce variability in the exact position where a tape cartridge should be placed or retrieved, especially in instances where magazines are stacked one on top of another. The retrieval assembly needs to be able to place and retrieve a tape cartridge reliably, and in previous generations "hunting" has been used to determine the unique locations of the storage slots. The concept of "hunting" can too often be unreliable and/or unnecessarily time consuming.

Accordingly, it is desired to develop a system and method in which the retrieval assembly can quickly, reliably, and accurately position a media cartridge, such as a tape cartridge, within a desired storage slot and/or remove a media cartridge, such as a tape cartridge, from a given storage slot. It is appreciated that such a system and method can alternatively be implemented for use within a media drive, such as a tape drive, in which the retrieval assembly can be used for quickly, reliably, and accurately positioning a media cartridge within a desired media drive and/or removing a media cartridge from a given media drive.

SUMMARY

In various embodiments, the present invention is directed toward a media library including a storage slot, a first target, a retrieval assembly, and a control system. The storage slot is configured to receive and retain a media cartridge. The first target is coupled to the storage slot. The retrieval assembly is configured to move the media cartridge into and out of the storage slot. The retrieval assembly includes an assembly body, an image capturing apparatus that is coupled to the assembly body, and a second target that is coupled to the assembly body. The control system includes a processor that is configured to control operation of the retrieval assembly. When the retrieval assembly is positioned near the storage slot, the image capturing apparatus has a field of view that captures both the first target and the second target. The control system is configured to calculate an offset between the first target and the second target within the field of view along at least one axis.

In some embodiments, the control system is configured to calculate the offset between the first target and the second target within the field of view along two axes.

In many embodiments, the control system moves and repositions the retrieval assembly relative to the storage slot based on the calculated offset so that the first target substantially overlaps the second target within the field of view of the image capturing apparatus.

In certain implementations, when the first target substantially overlaps the second target within the field of view of the image capturing apparatus, the retrieval assembly is aligned relative to the storage slot so that the retrieval assembly can accurately position the media cartridge within the storage slot.

In other implementations, when the first target substantially overlaps the second target within the field of view of the image capturing apparatus, the retrieval assembly is aligned relative to the storage slot so that the retrieval assembly can accurately retrieve the media cartridge from within the storage slot.

In certain embodiments, the control system is configured to save data of where the retrieval assembly has been repositioned relative to the storage slot so that the first target substantially overlaps the second target within the field of view of the image capturing apparatus.

In some embodiments, the control system is coupled to the assembly body of the retrieval assembly.

In certain embodiments, the image capturing apparatus and the control system are embedded within the assembly body of the retrieval assembly.

In some embodiments, the media library further includes a lighting system that is coupled to the assembly body of the retrieval assembly. The lighting system is configured to illuminate at least the first target and the second target within the field of view of the image capturing apparatus.

In certain embodiments, the media library further includes a media drive that is configured to one of write data to and read data from storage media that is retained within the media cartridge.

In some embodiments, the retrieval assembly is configured to move the media cartridge between the storage slot and the media drive.

In certain embodiments, the media library further includes a library housing, and a plurality of storage slots that are each configured to receive and retain at least one of a plurality of media cartridges. The plurality of storage slots can be incorporated within a magazine.

In some embodiments, the magazine can be selectively moved into and out of the library housing.

The present invention is further directed toward a method for aligning a retrieval assembly relative to a storage slot within a media library, including the steps of coupling a first target to the storage slot; coupling an image capturing apparatus to the retrieval assembly; coupling a second target to the retrieval assembly; positioning the retrieval assembly near the storage slot under control of a control system including a processor; capturing the first target and the second target within a field of view of image capturing apparatus; and calculating an offset between the first target and the second target within the field of view along at least one axis with the control system.

The present invention is also directed toward a media library including a storage slot that is configured to receive and retain a media cartridge; a first target that is coupled to the storage slot; a retrieval assembly that is configured to move the media cartridge into and out of the storage slot, the retrieval assembly including an assembly body, an image capturing apparatus that is coupled to the assembly body, and a second target that is coupled to the assembly body; a media drive that is configured to one of write data to and read data from storage media that is retained within the media cartridge, the retrieval assembly being configured to move the media cartridge between the storage slot and the media drive; and a control system including a processor that is configured to control operation of the retrieval assembly, the control system being coupled to the retrieval assembly; wherein when the retrieval assembly is positioned near the storage slot, the image capturing apparatus has a field of view that captures both the first target and the second target; wherein the control system is configured to calculate an offset between the first target and the second target within the field of view along at least one axis; wherein the control system moves and repositions the retrieval assembly relative to the storage slot based on the calculated offset so that the first target substantially overlaps the second target within the field of view of the image capturing apparatus; and wherein when the first target substantially overlaps the second target within the field of view of the image capturing apparatus, the retrieval assembly is aligned relative to the storage slot so that the retrieval assembly can one of (i) accurately position the media cartridge within the storage slot, and (ii) accurately retrieve the media cartridge from within the storage slot.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

Figure 1:
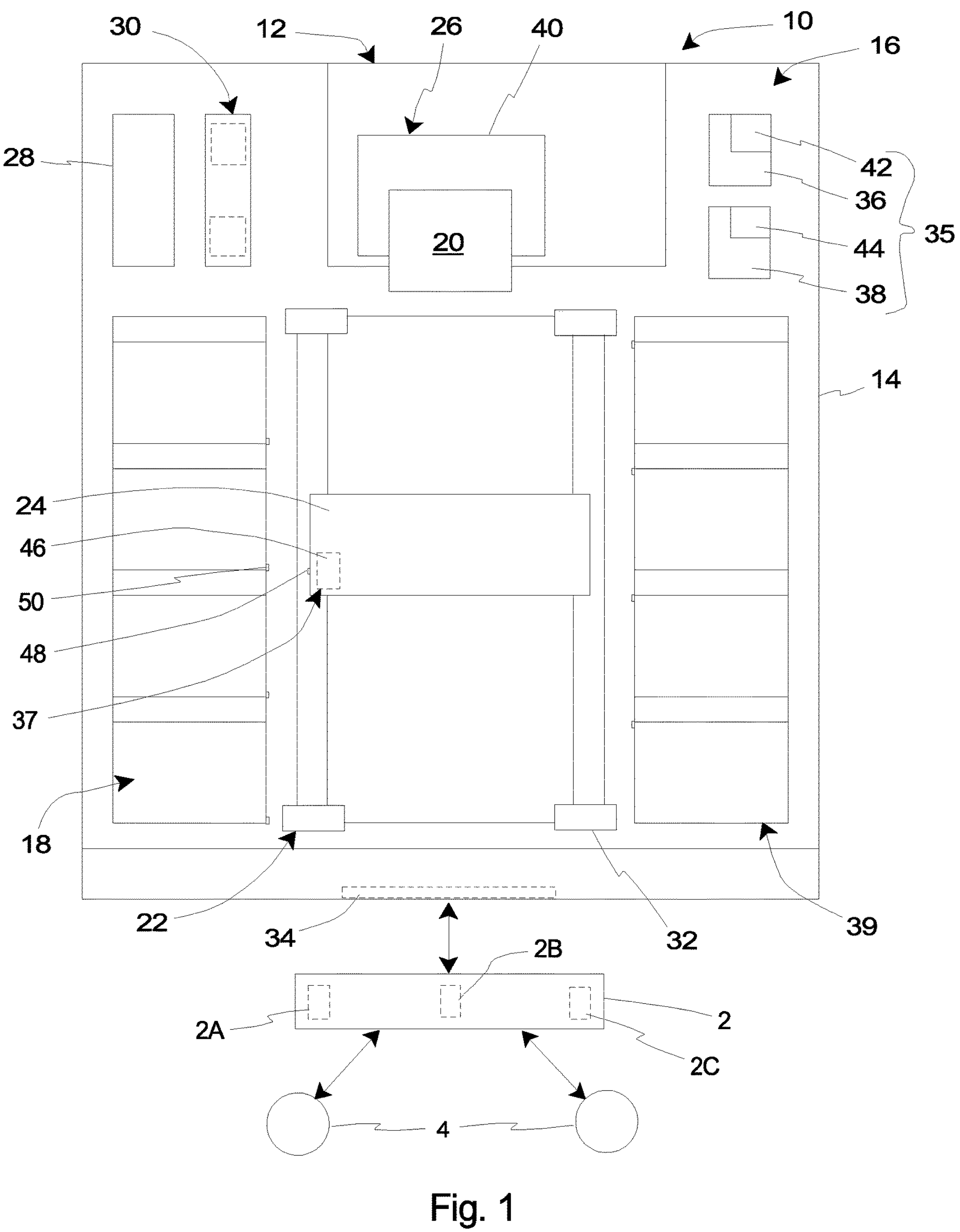
FIG. 1 is a simplified schematic top view illustration of an embodiment of an automated media library system having features of the present invention, the automated media library system including a retriever alignment system.

While embodiments of the present invention are susceptible to various modifications and alternative forms, specifics thereof have been shown by way of example and drawings, and are described in detail herein. It is understood, however, that the scope herein is not limited to the particular embodiments described. On the contrary, the intention is to cover modifications, equivalents, and alternatives falling within the spirit and scope herein.

DESCRIPTION

Embodiments of the present invention are described herein in the context of a retriever alignment system and related method in which a media library includes a retrieval assembly that can quickly, reliably, and accurately position a media cartridge within a desired storage slot and/or remove or retrieve a media cartridge from within a given storage slot. More particularly, the present invention includes a camera-guided retrieval assembly for use within the media library to perform the desired functions.

It is understood that no existing media libraries use a camera for such alignment of the retrieval assembly relative to the storage slot. However, camera and machine vision technology has made strides in recent years, and it is now possible to deploy an embedded system, i.e. the camera and corresponding technology has been miniaturized to the extent that the camera and machine vision technology can be embedded into the retrieval assembly. Previously, such cameras and machine vision technology were reserved for computer systems that were too large to be so embedded. It is further appreciated that the retriever alignment system of the present invention, with the camera and machine vision technology being incorporated and/or embedded within the retrieval assembly, should also save vast amounts of time compared to traditional slot "hunting", as described above.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 1 is a simplified schematic top view illustration of one or more hosts 2 (only one is illustrated in FIG. 1), one or more users 4 (two are illustrated in FIG. 1), and an automated media library system 10 (also referred to herein simply as a "media library") having features of the present invention.

As illustrated, the one or more hosts 2 provide a means of access to the media library 10 for the one or more users 4. For example, during operation, the one or more users 4 can issue requests or instructions to the media library 10 that are forwarded via the one or more hosts 2. The one or more hosts 2 can include host firmware 2A (illustrated as a box in phantom), host hardware 2B (illustrated as a box in phantom) and host software 2C (illustrated as a box in phantom) for purposes of forwarding user requests to the media library 10 and/or for performing any other functions of the one or more hosts 2.

As illustrated, the media library 10 includes a media drive system 12 that includes one or more media drives 26 that are usable for writing data to and reading data from storage media (not shown) that is retained within a media cartridge 20. In various embodiments, the media library 10 can be a tape library that includes a tape drive system including one or more tape drives that are usable for writing data to and reading data from magnetic tape that is retained within a tape cartridge.

In FIG. 1, a top cover (not shown) has been omitted for clarity so that the interior of the media library 10 is visible. The design of the media library 10 can be varied as desired. In particular, the media library 10 can have any suitable design that is capable of storing a plurality of media cartridges 20 and using one or more media drives 26 to write data to and read data from the plurality of media cartridges 20. More specifically, it is noted that the media library 10 illustrated in FIG. 1 is just one non-exclusive example of a media library 10 usable with the present invention, and no limitations are intended based on the specific type and/or size of the media library 10 shown in FIG. 1.

In various embodiments, as illustrated in FIG. 1, the media library 10 can include one or more of: (i) a library housing 14 that defines a library interior 16, (ii) a plurality of storage slots 18 that are each configured to receive and selectively retain (and store) a media cartridge 20, (iii) a rack assembly 22 including one or more racks 32, (iv) a media cartridge retrieval assembly 24 (also referred to herein as a "retrieval assembly"), (v) the media drive system 12 including the one or more media drives 26, (vi) a power supply 28, (vii) a library control system 30, (viii) a graphical user interface 34 (illustrated in phantom, and also sometimes referred to herein as a "GUI"), (ix) a climate controller 35 that can include one or more temperature controllers 36 (only one temperature controller 36 is illustrated in FIG. 1), and/or one or more humidity controllers 38 (only one humidity controller 38 is illustrated in FIG. 1), and (x) a retriever alignment system 37. It is appreciated that in different embodiments, the media library 10 can include more components or fewer components than what is illustrated and described in relation to FIG. 1. It is further appreciated that the various components of the media library 10 can be positioned in a different manner than what is shown in FIG. 1.

As an overview, in various embodiments, the present invention is directed toward the retriever alignment system 37 and related method in which the retrieval assembly 24 includes an image capturing apparatus 46, such as a camera, that is coupled thereto and/or positioned or embedded therein. In many embodiments, the retriever alignment system 37 further includes a first target 48 that is coupled to the retrieval assembly 24, and a plurality of second targets 50, with one second target 50 being coupled to each of the storage slots 18.

During use of the media library 10, the retrieval assembly 24, upon request of a user 4 or host 2, can be moved generally toward a particular storage slot 18 for purposes of retrieving a media cartridge 20 therefrom or positioning a media cartridge 20 therein, such as during a process of performing a designated or requested read/write operation. Once the retrieval assembly 24 is positioned generally in the appropriate vicinity of the particular storage slot 18, the image capturing apparatus 46 can be activated to locate the first target 48 and the second target 50 within a field of view 452 (illustrated in FIG. 4A) of the image capturing apparatus 46. In various embodiments, with the manner in which the first target 48 can be coupled to the retrieval assembly 24, the first target 48 can be fixed in position within the field of view 452 of the image capturing apparatus.

With the design of the retriever alignment system 37, as described herein, the first target 48 and the second target 50 substantially overlapping within the field of view 452 of the image capturing apparatus 46 is an indication that sufficiently precise alignment exists between the retrieval assembly 24 and the storage slot 18 such that the retrieval assembly 24 can accurately retrieve a media cartridge 20 from within the storage slot 18 or position a media cartridge 20 within the storage slot 18.

However, it is appreciated that an initial moving of the retrieval assembly 24 relative to the appropriate storage slot 18 is unlikely to have the retrieval assembly 24 sufficiently precisely aligned relative to the storage slot 18 so that immediate and direct access to the storage slot 18 for the retrieval assembly 24 is enabled. Rather, it is likely, such as due to any potential machine tolerances, that the retrieval assembly 24 will be positioned in a manner that is slightly offset relative to such desired precise alignment, such as within approximately 0.5 millimeters along one or more axes. In such situations, the library control system 30 or another control system, in conjunction with the image capturing apparatus 46, can determine an offset 454 (illustrated in FIG. 4B) of the first target 48 relative to the second target 50 within the field of view 452 along the one or more axes, such as in terms of pixels or millimeters. The library control system 30 or another control system can then control the retrieval assembly 24 so that the retrieval assembly 24 is repositioned such that the first target 48 sufficiently overlaps the second target 50 within the field of view 452 of the image capturing apparatus 46. Then, with the retrieval assembly 24 thus accurately aligned with the storage slot 18, the retrieval assembly 24 can quickly, easily, and accurately retrieve the media cartridge 20 from the storage slot 18 or position the media cartridge 20 within the storage slot 18, as desired. This is all achievable without the need for "hunting" as has been used previously for ensuring the desired accurate alignment between the retrieval assembly 24 and the storage slot 18. As utilized herein, stating that the first target 48 and the second target 50 are "substantially" overlapping or "sufficiently" overlapping within the field of view 452 of the image capturing apparatus 46 is intended to signify that the first target 48 and the second target 50 overlap in the field of view 452 of the image capturing apparatus 46 within certain pre-established tolerances. For example, in certain embodiments, the first target 48 being said to "substantially" or "sufficiently" overlap the second target 50 within the field of view 452 can be within between approximately 0.01 millimeters and 0.1 millimeters of a complete overlap where centers of each target 48, 50 specifically coincide with one another.

In certain embodiments, data or information relevant to the necessary repositioning of the retrieval assembly 24 relative to the particular storage slot 18 can be saved by the library control system 30 or another control system so that the retrieval assembly 24 can more quickly be sufficiently precisely aligned relative to the particular storage slot 18 in any future uses of the particular storage slot 18.

It is appreciated that the retriever alignment system 37 and related method can alternatively be utilized by coupling a comparable target to each of the media drives 26, for purposes of ensuring accurate alignment of the retrieval assembly 24 relative to a designated media drive 26 when it is desired to position a media cartridge 20 within the media drive 26 or remove a media cartridge 20 from within the media drive 26.

It is further appreciated that, although the present invention is often illustrated and described as being incorporated into a tape library that includes a tape drive system including one or more tape drives, a plurality of storage slots that are each configured to receive and selectively retain (and store) a tape cartridge, and a tape cartridge retrieval assembly that moves the tape cartridges between the storage slots and the tape drives, the present invention can also be implemented within a different type of media library. For example, it is understood that the present invention may be similarly applicable for use with any other suitable types of media libraries using other types of media drives and media cartridges, such as optical disks, magnetic disk drives, emulated or virtual media drives, etc., as non-exclusive examples.

The library housing 14 is configured to retain various components of the media library 10. For example, in the embodiment illustrated in FIG. 1, the plurality of storage slots 18, the rack assembly 22 including the rack(s) 32, the retrieval assembly 24, the one or more media drives 26 of the media drive system 12, the power supply 28, the library control system 30, the climate controller 35, and the retriever alignment system 37 can all be received and retained at least substantially, if not entirely, within the library interior 16 that is defined by the library housing 14. As illustrated in FIG. 1, the library housing 14 can be rigid and can have a substantially rectangular-shaped cross-section. Alternatively, the library housing 14 can have another suitable shape or configuration. For example, the library housing 14 can have a substantially square-shaped cross-section or any other suitable shaped cross-section. In many embodiments, the library housing 14 may be constructed of any number of conventional materials such as, for example, those utilized in industry standard rack mount cabinets.

In the embodiment shown in FIG. 1, the plurality of storage slots 18 can be positioned within the library housing 14, with the storage slots 18 being configured to receive and retain (and store) the media cartridge(s) 20. More particularly, in various embodiments, each of the storage slots 18 is configured to receive and retain a single media cartridge 20. Alternatively, in other embodiments, one or more of the storage slots 18 can be configured to receive and retain more than one media cartridge 20, such as with one media cartridge 20 being positioned behind another within a given storage slot 18. It is noted that no media cartridges 20 are shown as being retained within the storage slots 18 in FIG. 1 for clarity.

The media library 10 can include any suitable number of storage slots 18, and/or the media library 10 can be designed to retain any suitable number of media cartridges 20. Moreover, the storage slots 18 can be arranged within the media library 10 in any suitable manner. For example, in certain embodiments, the media library 10 can include forty storage slots 18 arranged in two four-by-five storage areas. More particularly, in this embodiment, the media library 10 includes two magazines 39, one on each side of the retrieval assembly 24, with each magazine 39 including four columns of storage slots 18, and with each column having five storage slots 18 oriented substantially horizontally one on top of another (with limited spacing therebetween). It is understood that from the simplified top view shown in FIG. 1, the number of storage slots 18 in each column is not readily apparent. Alternatively, the media library 10 can include greater than forty or fewer than forty storage slots 18 and/or the storage slots 18 can be arranged in a different manner than is illustrated and described in relation to FIG. 1. For example, in certain non-exclusive alternative embodiments, the media library 10 can be configured to include more than two magazines 39, which can be positioned and oriented in any suitable manner relative to one another, and/or the media library 10 can be configured to include hundreds or even thousands of storage slots 18. In other embodiments, the media library 10 can only include a single magazine 39, or no magazines, with each of the storage slots 18 being independently positioned within the library housing 14.

It is appreciated that the magazines 39, with the storage slots 18 incorporated therein, can be selectively moved into and out of the library housing 14 as deemed necessary and appropriate.

The design and configuration of the rack assembly 22 can be varied to suit the specific requirements of the media library 10. For example, in one non-exclusive embodiment, the rack assembly 22 can include four individual racks 32 that are spaced apart from one another. In some embodiments, each rack 32 can be oriented in a generally vertical direction and can extend a height that is sufficient to enable the retrieval assembly 24 to effectively retrieve a media cartridge 20 from any of the plurality of storage slots 18. Alternatively, the rack assembly 22 can include a different number of racks 32. For example, in some non-exclusive alternative embodiments, the rack assembly 22 can include two racks 32, three racks 32 or more than four racks 32 that can be spaced apart from one another.

The retrieval assembly 24 selectively, such as upon request of a user 4 or host application 2, retrieves and moves the media cartridge 20 as desired between the storage slots 18 and the media drives 26. In particular, during use, upon receiving a signal from the library control system 30 to access a certain media cartridge 20, the retrieval assembly 24 can be manipulated to move in a desired manner along the rack assembly 22 in order to physically retrieve the requested media cartridge 20 from its associated storage slot 18 in the media library 10. Subsequently, the retrieval assembly 24 moves the media cartridge 20 to an appropriate media drive 26, and inserts the media cartridge 20 into a drive housing 40 of the media drive 26 so that the requested read/write operations can be performed. Upon completion of the requested read/write operations, the retrieval assembly 24 can then return the media cartridge 20 to an appropriate storage slot 18.

It is appreciated that although a single retrieval assembly 24 is illustrated in FIG. 1, the media library 10 can be designed to include more than one retrieval assembly 24. For example, in one non-exclusive alternative embodiment, the media library 10 can include two retrieval assemblies 24 that function in different portions of the media library 10 and/or that provide redundancy in the event that one of the retrieval assemblies 24 fails.

The one or more media drives 26 can be configured for reading and/or writing data with respect to the media cartridge 20. The number of media drives 26 provided within the media library 10 can be varied to suit the specific requirements of the media library 10. For example, in certain embodiments, the media library 10 can include three media drives 26 that are stacked substantially one on top of another (with limited spacing therebetween). Alternatively, the media library 10 can include greater than three or fewer than three media drives 26 and/or the media drives 26 can be positioned in a different manner relative to one another. For example, in certain non-exclusive alternative embodiments, the media library 10 can be configured to include one hundred or more media drives 26. Still alternatively, depending on the specific design of the media library 10, the media drives 26 can be adapted for use with different types of media, such as tape cartridges, optical drives, hard disk drives, etc.

In certain embodiments, the media library 10 can include more than a single media drive system 12 for purposes of providing the one or more media drives 26. For example, in some embodiments, the media library 10 can include a plurality of media drive systems 12, with each media drive system 12 including one or more individual media drives 26. In one non-exclusive embodiment, the media library 10 can include three individual media drive systems 12, with each media drive system 12 including a single media drive 26, to provide a total of three media drives 26 for the media library 10. Alternatively, the media library 10 can include any desired number of media drive systems 12 and/or media drives 26.

The power supply 28 provides electrical power in a well-known manner to the one or more media drives 26, the retrieval assembly 24, the library control system 30, the GUI 34, the climate controller 35, the retriever alignment system 37 and/or additional media libraries 10. The power supply 28 can be interfaced with these components as well as with an external power source in a well-known manner using industry-standard cabling and connections. Alternatively, the power supply 28 can be interfaced with these components in another suitable manner.

The library control system 30 provides the desired and necessary control for oversight functionality of the media library 10. The library control system 30 can have any suitable design, many of which are well-known in the industry. For example, in one embodiment, the library control system 30 can include a standard driver interface unit for receiving digital commands and translating the commands into driving currents, such as step pulses for controlling stepper motors that can be used to move the retrieval assembly 24 in a desired manner, and/or for controlling the climate controller 35. In another embodiment, the library control system 30 can include a standard programmable general-purpose computer formed on a single plug-in card unit and can include a programmed microprocessor or microcontroller, memory, communication interface, control interface, connectors, etc. Alternatively, the library control system 30 can have a different design and/or the library control system 30 can be positioned within the media library 10 in a different position or manner than that illustrated in FIG. 1.

The media library 10 can use well-known industry standard cabling and communication protocols between the library control system 30 and other structures of the media library 10. Cabling and electrical characteristics including signaling protocols can be generally standardized, and the logical message protocols can be either proprietary or standardized as known to those skilled in the art.

As shown, the media library 10 can also include the GUI 34, such as an interactive touchscreen graphical user interface or another suitable graphical user interface, which allows the user 4 or host 2 to interact with and/or transmit requests or commands to and/or from the media library 10.

The climate controller 35 controls the climate within the library interior 16. In various embodiments, the climate controller 35 can regulate, adjust, control and/or maintain a specific climate within the library interior 16. In certain embodiments, at various times, the specific climate that is regulated, adjusted, controlled and/or maintained by the climate controller 35 within the library interior 16 can be based on a climate outside of the library interior 16. As noted, in certain embodiments, the climate controller 35 includes the temperature controller 36 and the humidity controller 38.

The temperature controller 36 regulates and/or adjusts the temperature within the library interior 16 of the media library 10. The design and/or particular type of temperature controller 36 included in the media library 10 can vary. For example, the temperature controller 36 can include any suitable type of cooling unit that can selectively lower the temperature within the library interior 16; and/or the temperature controller 36 can include any suitable type of heating unit that can selectively increase the temperature within the library interior 16. In various embodiments, the temperature controller 36 can include one or more temperature sensors 42 (only one temperature sensor 42 is illustrated in FIG. 1) that can sense an ambient temperature within or outside of the library interior 16. The temperature sensor(s) 42 can have any suitable design and/or can be positioned in any suitable location(s), such as within and outside of the library interior 16 of the media library 10. In certain embodiments, the temperature controller 36 can receive data from the temperature sensor 42, and automatically adjust and/or control the temperature within the library interior 16 in accordance with predetermined temperature standards based on such data.

The humidity controller 38 regulates and/or adjusts the humidity within the library interior 16 of the media library 10. The design and/or particular type of humidity controller 38 included in the media library 10 can vary. For example, the humidity controller 38 can include any type of humidifier or dehumidifier, or any other suitable type of humidity controller 38 that can selectively change (raise or lower) and/or control the humidity within the library interior 16. In various embodiments, the humidity controller 38 can include one or more humidity sensors 44 (only one humidity sensor 44 is illustrated in FIG. 1) that can sense the humidity within or outside of the library interior 16. The humidity sensor(s) 44 can have any suitable design and/or can be positioned in any suitable location(s), such as within and outside of the library interior 16 of the media library 10. In certain embodiments, the humidity controller 38 can receive data from the humidity sensor 44, and automatically adjust and/or control the humidity within the library interior 16 in accordance with predetermined humidity standards based on such data.

The retriever alignment system 37 is configured to enable the retrieval assembly 24 to quickly, easily and accurately move media cartridges 20 between the storage slots 18 and the media drives 26. More particularly, in various embodiments, the retriever alignment system 37 is configured to quickly, easily, and accurately align the retrieval assembly 24 relative to individual storage slots 18 when it is desired to remove a media cartridge 20 from within the storage slot 18 and/or to position a media cartridge 20 within the storage slot 18. Alternatively, in other embodiments, the retriever alignment system 37 can be configured to quickly, easily, and accurately align the retrieval assembly 24 relative to individual media drives 26 when it is desired to position a media cartridge 20 within the media drive 26 and/or to remove a media cartridge 20 from within the media drive 26.

Various design features that may be incorporated into the retriever alignment system 37 are illustrated and described in detail herein below in subsequent figures. However, as shown in FIG. 1, it is appreciated that various embodiments of the retriever alignment system 37 can include at least the image capturing apparatus 46 that is coupled to (such as mechanically coupled to) and/or positioned or embedded within the retrieval assembly 24, a first target 48 that is coupled to (such as mechanically coupled to) the retrieval assembly 24 so as to be substantially fixed in position within the field of view 452 of the image capturing apparatus 46, and a second target 50 that is coupled to (such as mechanically coupled to) a storage slot 18.

It is further appreciated that the use of the terms “first target” and “second target” is merely for convenience and ease of description, and either target 48, 50 can be referred to as the “first target” and/or the “second target”.

Figure 2A:
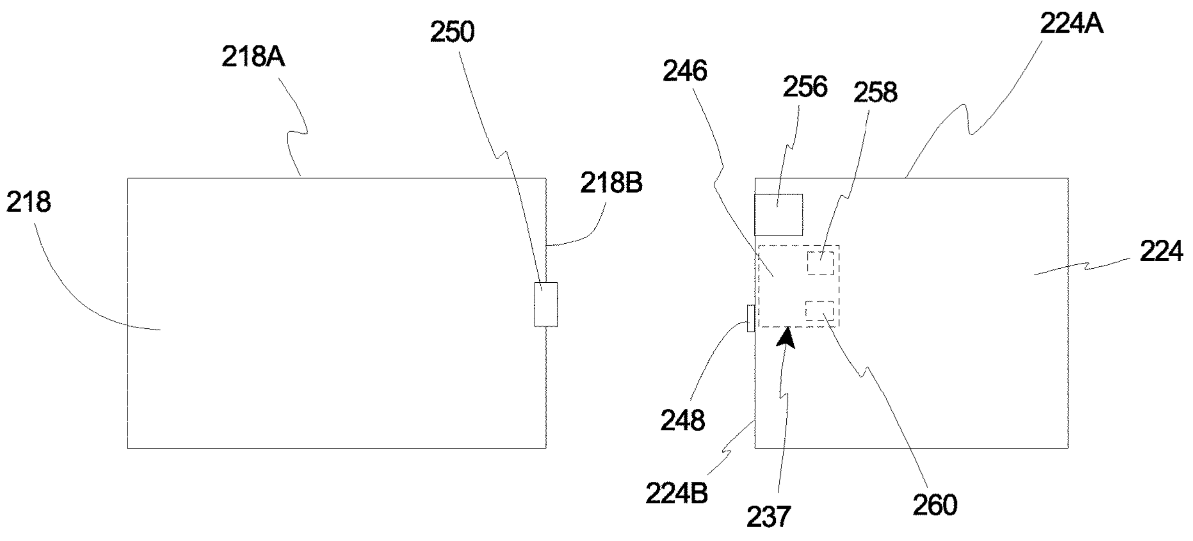
FIG. 2A is a simplified schematic side view illustration of an embodiment of the retriever alignment system including an embodiment of a retrieval assembly having an image capturing apparatus coupled therein and a first target coupled thereto, and an embodiment of a storage slot with a second target coupled thereto, and which can be incorporated within the automated media library system illustrated in FIG. 1.

FIG. 2A is a simplified schematic side view illustration of an embodiment of the retriever alignment system 237 having features of the present invention. As part of the retriever alignment system 237, FIG. 2A illustrates an embodiment of the retrieval assembly 224 (illustrated as a box) having an image capturing apparatus 246 (such as a camera or other suitable image capturing apparatus, illustrated in phantom) coupled therein and a first target 248 coupled thereto, and an embodiment of the storage slot 218 (illustrated as a box) with a second target 250 coupled thereto, which can be incorporated within the media library 10 illustrated in FIG. 1.

As described herein, the retriever alignment system 237 and related method are configured to assure sufficiently precise alignment, such as within tolerances of between approximately 0.01 millimeters and 0.1 millimeters in many embodiments, between the retrieval assembly 224 and the storage slot 218 when it is desired to position a media cartridge 20 (illustrated in FIG. 1) within the storage slot 218 and/or to remove a media cartridge 20 from within the storage slot 218.

The design of the retriever alignment system 237 can be varied to suit the requirements of the media library 10. In some embodiments, as illustrated in FIG. 2A, the retriever alignment system 237 can include one or more of (i) the image capturing apparatus 246, which is coupled to the retrieval assembly 224 and/or positioned or embedded therein, (ii) the first target 248, which is coupled to the retrieval assembly 224, (iii) the second target 250, which is coupled to the storage slot 218, (iv) a lighting system 256, (v) a power source 258 (illustrated in phantom), and (vi) a system controller 260 (illustrated in phantom). Alternatively, the retriever alignment system 237 can include more components or fewer components than those specifically identified in FIG. 2A. Still alternatively, the various components of the retriever alignment system 237 can be positioned in a different manner than what is shown in FIG. 2A.

As shown, in certain embodiments, the retrieval assembly 224 has an assembly body 224A, and the image capturing apparatus 246 can be coupled to the assembly body 224A in any suitable manner. For example, in one embodiment, the image capturing apparatus 246 can be coupled to the assembly body 224A in such a manner that the image capturing apparatus 246 is positioned (or embedded) at least substantially, if not entirely, within the assembly body 224A. In another embodiment, the image capturing apparatus 246 can be coupled to an outer surface of the assembly body 224A.

The first target 248 can be coupled to the retrieval assembly 224 in any suitable manner and in any suitable position. In some embodiments, the first target 248 can be coupled to the retrieval assembly 224 at, near and/or adjacent to a body end 224B of the assembly body 224A that is nearest to the storage slot 218. It is appreciated that the first target 248 is positioned in such a manner that enables the first target 248 to be captured within a field of view 452 (illustrated in FIG. 4A) of the image capturing apparatus 246. More particularly, as noted herein, the manner in which the first target 248 is coupled to the retrieval assembly 224 enables the first target 248 to be substantially fixed in position within the field of view 452 of the image capturing apparatus 246.

It is further appreciated that the first target 248 can have any suitable design, size, shape, color, etc. that enables the first target 248 to be easily seen by the image capturing apparatus 246, within the field of view 452 of the image capturing apparatus 246.

As noted above, the storage slot 218 is configured to receive and retain (and store) a media cartridge 20. The storage slot 218 can have any suitable design that is able to effectively receive and retain (and store) the media cartridge 20. In many embodiments, the storage slot 218 can have a slot body 218A that is substantially rectangular box-shaped, with an open slot end 218B through which the media cartridge 20 can be inserted into and/or removed from the storage slot 218. Alternatively, the storage slot 218 can have another suitable size, shape and/or design.

In certain alternative embodiments, the storage slot 218 can be configured to receive and retain (and store) more than one media cartridge 20, such as with multiple media cartridges 20 being positioned one behind another.

As further noted, in various embodiments, the storage slot 218 can have the second target 250 being coupled thereto. More particularly, in some embodiments, the second target 250 can be coupled to the slot body 218A at, near and/or adjacent to the open slot end 218B. It is appreciated that the second target 250 can have any suitable design, size, shape, color, etc., and can be coupled to the storage slot 218 in any suitable location, that enables the second target 250 to be easily seen by the image capturing apparatus 246, within the field of view 452 of the image capturing apparatus 246. In one embodiment, the second target 20 can be provided in the form of a latch that is used to help retain the media cartridge 20 within the storage slot 218. Alternatively, the second target 250 can be provided in another suitable manner.

The second target 250 can be coupled to the storage slot 218, such as to the slot body 218A, in any suitable position so that the second target 250 can be easily seen within the field of view 452 of the image capturing apparatus 246. More particularly, as described in greater detail herein below, the second target 250 will typically be coupled to the storage slot 218 in such a manner that its position relative to the first target 248 can be easily visualized within the field of view 452 of the image capturing apparatus 246.

As provided herein, with the retriever alignment system 237 and related method of the present invention, the image capturing apparatus 246 is coupled to the assembly body 224A and/or the retrieval assembly 224 in such a manner as to be focused generally toward the storage slot 218 when the retrieval assembly 224 is being used to position a media cartridge 20 within the storage slot 218 and/or to remove a media cartridge 20 from within the storage slot 218. More specifically, the image capturing apparatus 246 is directed so as to focus generally toward the second target 250 that is coupled to the slot body 218A of the storage slot 218, such that both the first target 248 and the second target 250 are readily captured within the field of view 452 of the image capturing apparatus 246.

As described in greater detail herein below, during use of the retriever alignment system 237, the positioning of the retrieval assembly 224, and thus the positioning of the image capturing apparatus 246, can be adjusted as necessary so that the image capturing apparatus 246 is focused more directly toward the second target 250, and/or such that the first target 248 and the second target 250 substantially overlap within the field of view 452 of the image capturing apparatus 246. At such time, the retrieval assembly 224 can then be utilized to accurately position the media cartridge 20 within the storage slot 218 and/or accurately remove the media cartridge 20 from within the storage slot 218.

The lighting system 256 is configured to illuminate any area or objects within the field of view 452 of the image capturing apparatus 246. More particularly, in many embodiments, the lighting system 256 is configured to illuminate at least the first target 248 and the second target 250 within the field of view 452 of the image capturing apparatus 246 when the image capturing apparatus 246 is being utilized as part of the retriever alignment system 237 to assure precise and accurate alignment between the retrieval assembly 224 and the storage slot 218. It is appreciated that the lighting system 256 can have any suitable design for purposes of providing desired illumination for the area or objects within the field of view 452 of the image capturing apparatus 246. For example, in certain alternative embodiments, the lighting system 256 can include any suitable number of individual light sources at any suitable intensities and at any suitable wavelengths. It is further appreciated that the lighting system 256, and/or the individual light sources of the lighting system 256, can be positioned and oriented in any suitable manner for purposes of effectively illuminating the area or objects within the field of view 452 of the image capturing apparatus 246.

In some embodiments, as illustrated, the lighting system 256 can be coupled to (such as mechanically coupled to) and/or positioned at least substantially within the assembly body 224A of the retrieval assembly 224.

The power source 258 is configured to provide any necessary or desired power to the retrieval assembly 224, the image capturing apparatus 246, the lighting system 256 and/or the system controller 260, independently, and/or in conjunction with the power supply 28 (illustrated in FIG. 1). The power source 258 can have any suitable design. For example, in some embodiments, the power source 258 is a battery that can be positioned in any suitable manner relative to the retrieval assembly 224, the image capturing apparatus 246, the lighting system 256 and the system controller 260. In other embodiments, the power source 258 can include one or more super capacitors or similar power storage technology. Still alternatively, the power source 250 can be any other suitable type of power source known in the industry.

In certain embodiments, as illustrated, the power source 258 can be coupled to (such as mechanically coupled to) and/or positioned within the assembly body 224A of the retrieval assembly 224.

The system controller 260 is configured to provide any necessary or desired control for the retrieval assembly 224, the image capturing apparatus 246 and the lighting system 256, independently, and/or in conjunction with the library control system 30 (illustrated in FIG. 1). The system controller 260 can have any suitable design, many of which are well-known in the industry. For example, in one embodiment, the system controller 260 can be a low power controller capable of operating one or more of the retrieval assembly 224, the image capturing apparatus 246 and the lighting system 256 substantially simultaneously. In another embodiment, the system controller 260 can include a standard programmable general-purpose computer formed as a single unit and can include a programmed microprocessor or microcontroller, memory, communication interface(s), control interface(s), connectors, etc. Alternatively, the system controller 260 can have a different design. The system controller 260 can also be configured to communicate with an external device, such as the library control system 30 and/or a host 2 (illustrated in FIG. 1) that is external to the media library 10.

In some embodiments, the system controller 260 can be configured to process data from the image capturing apparatus 246 for purposes of establishing the desired alignment between the retrieval assembly 224 and the storage slot 218. In other embodiments, the system controller 260 can collect and hold (save) data for communication to the library control system 30 and/or the host 2. In still other embodiments, the system controller 260 can have wireless communication capability where the system controller 260 can communicate essentially real-time with the library control system 30 or the host 2. The word "essentially" as used with the system controller 260 takes into consideration any effects on the flow of data due to disturbances in the communication medium. For example, when the system controller 260 communicates wirelessly, interference caused by other portions of the retriever alignment system 237, other portions of the media library 10, or external sources of interference may cause slowdown in the data flow resulting in data not being presented instantaneously but still effectively delivers data to the library control system 30 or the host 2 on a usable time basis.

In many embodiments, as illustrated, the system controller 260 can be coupled to (such as mechanically coupled to) and/or positioned (or embedded) within the assembly body 224A of the retrieval assembly 224.

It is appreciated that since the library control system 30 and the system controller 260 function alternatively and/or cooperatively for purposes of ensuring proper alignment between the retrieval assembly 224 and the storage slot 218, the library control system 30 and the system controller 260 can sometimes be referred to individually or collectively as a "control system".

Figure 2B:
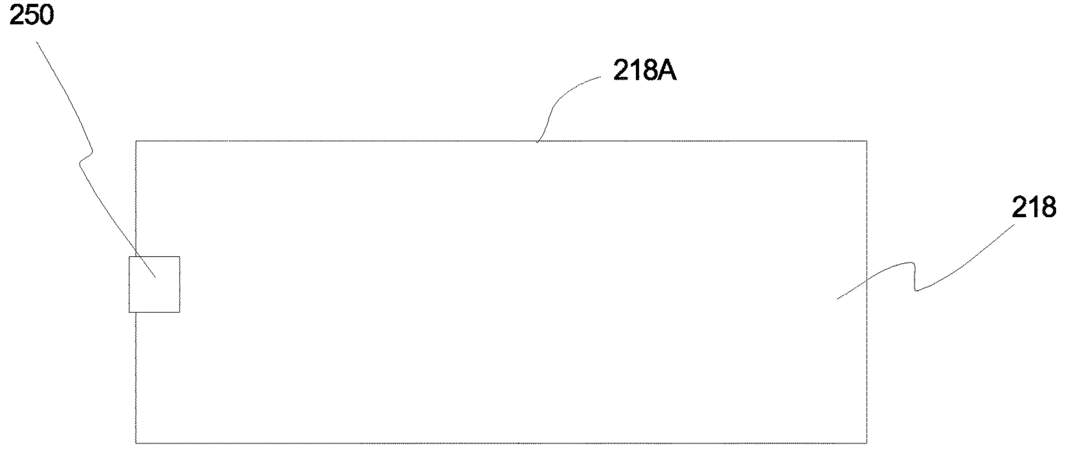
FIG. 2B is a simplified schematic front view illustration of the storage slot illustrated in FIG. 2A, with the second target coupled thereto.

FIG. 2B is a simplified schematic front view illustration of the storage slot 218 illustrated in FIG. 2A, with the second target 250 being coupled to the slot body 218A.

Figure 3:
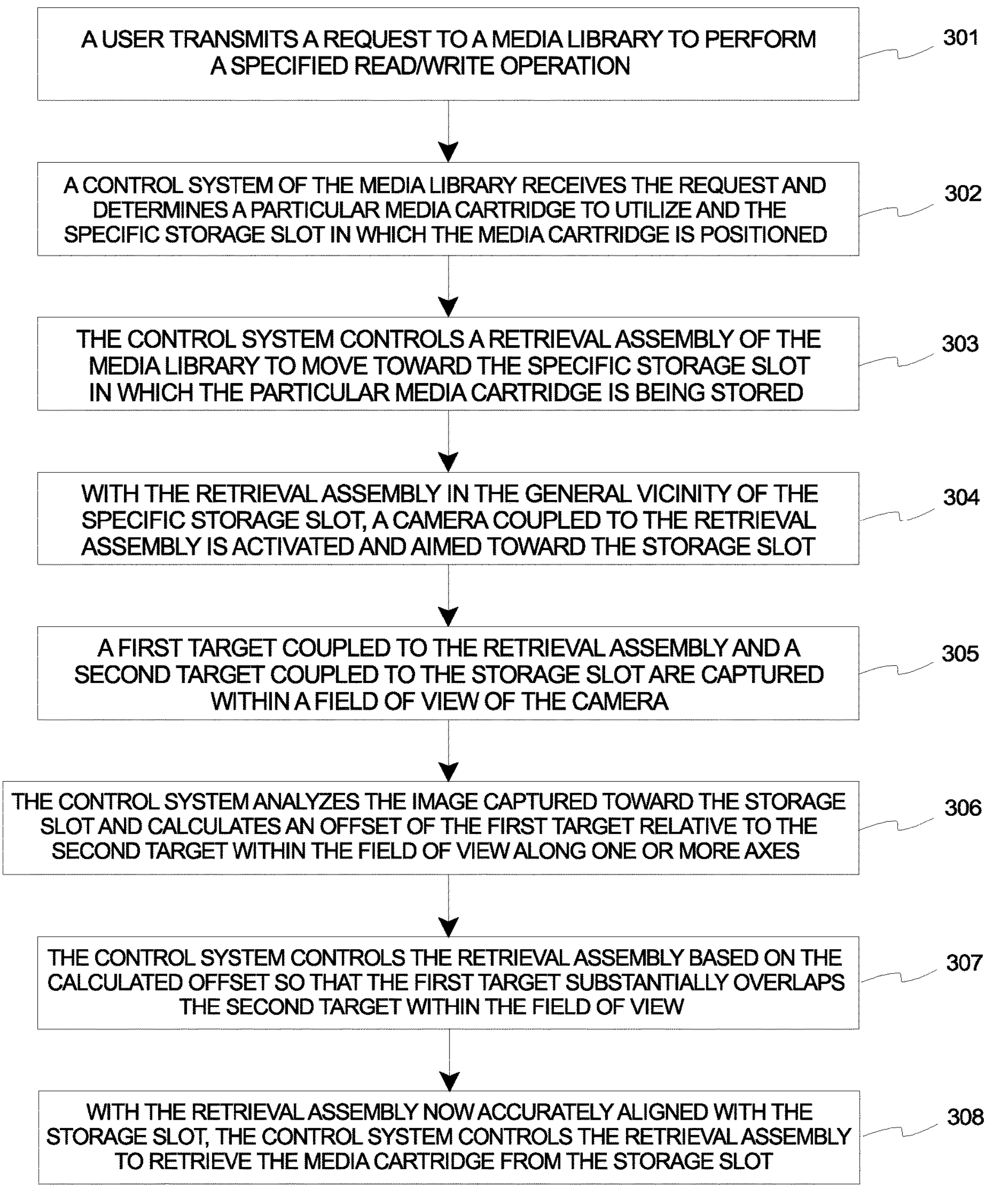
FIG. 3 is a flowchart that illustrates a method for utilizing the retriever alignment system as illustrated in FIG. 2A for ensuring desired accuracy in utilizing the retrieval assembly to retrieve a media cartridge from within the storage slot.

FIG. 3 is a flowchart that illustrates a system and method for utilizing the retriever alignment system as illustrated in FIG. 2A for ensuring desired accuracy in utilizing the retrieval assembly to retrieve a media cartridge from within the storage slot. It is recognized that in nonexclusive alternative embodiments, the system and method of FIG. 3 can include additional steps other than those specifically delineated herein or can omit certain of the steps that are specifically delineated herein. Moreover, in some embodiments, the order of the steps described below can be modified and/or certain steps can be combined without deviating from the spirit of the present invention.

At step 301, a user transmits a request to a media library, such as via a host application, to perform a certain specified read/write operation.

At step 302, a control system of the media library receives the request from the user, and determines the particular media cartridge to utilize for purposes of performing the requested read/write operation. The control system further determines the specific storage slot in the media library within which the particular media cartridge to be used is currently being stored. As described herein, the control system can incorporate the library control system 30 (illustrated in FIG. 1) and/or the system controller 260 (illustrated in FIG. 2A).

At step 303, the control system controls a retrieval assembly of the media library to move toward the specific storage slot in the media library within which the particular media cartridge to be used is currently being stored. It is appreciated that moving the retrieval assembly toward the specific storage slot under initial control of the control system will move the retrieval assembly to fairly close to where the retrieval assembly needs to be in order to accurately retrieve the particular media cartridge from within the specific storage slot. For example, in many embodiments, the initial positioning of the retrieval assembly relative to the storage slot will typically be within approximately 0.5 millimeters from precise alignment along one or more axes.

In various embodiments, the control system initially moves the retrieval assembly relative to the specific storage slot based on "Original Loading/Positioning Instructions" that are stored within the control system. However, due to certain mechanical tolerances, etc., such as noted above, the initial movement and positioning of the retrieval assembly is unlikely to have the retrieval assembly substantially precisely aligned relative to the specific storage slot that the retrieval assembly can accurately retrieve the particular media cartridge from within the specific storage slot.

At step 304, with the retrieval assembly being in the general vicinity of the specific storage slot, an image capturing apparatus (such as a camera or other suitable image capturing apparatus) that is coupled to and/or positioned or embedded within the retrieval assembly is activated by the control system and aimed toward the specific storage slot.

At step 305, a first target that is coupled to the retrieval assembly and a second target that is coupled to the specific storage slot are captured within a field of view of the image capturing apparatus as the image capturing apparatus is aimed toward the specific storage slot. As stated above in relation to step 303, it is appreciated that at this point the retrieval assembly may not be precisely aligned with the specific storage slot such that the first target substantially overlaps the second target within the field of view of the image capturing apparatus in such a manner where the retrieval assembly can accurately retrieve the particular media cartridge from within the specific storage slot. However, it is further appreciated that the first target will be at least substantially fixed in position within the field of view of the image capturing apparatus.

Figure 4A:
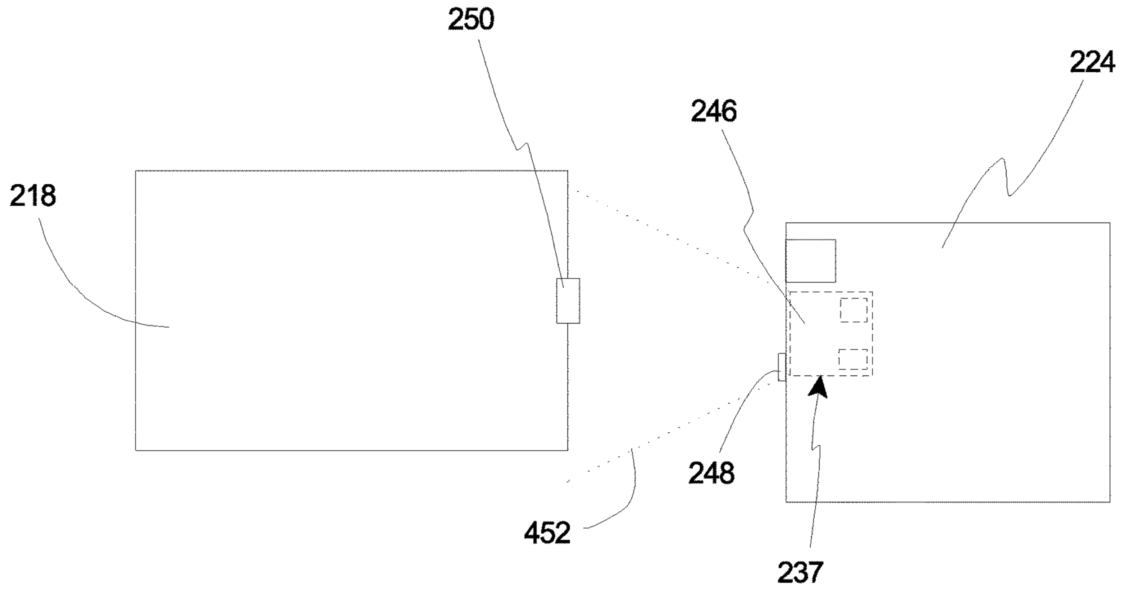
FIG. 4A is a simplified schematic side view illustration of the retrieval assembly having the image capturing apparatus coupled therein and the first target coupled thereto, and the storage slot with the second target coupled thereto, as illustrated in FIG. 2A, which further illustrates a field of view of the image capturing apparatus, and with the retrieval assembly not being aligned with the storage slot.

Referring now to FIG. 4A, FIG. 4A is a simplified schematic side view illustration of the retrieval assembly 224 having the image capturing apparatus 246 coupled therein and the first target 248 coupled thereto, and the storage slot 218 with the second target 250 coupled thereto, as illustrated in FIG. 2A, that are included as part of the retriever alignment system 237. As shown, FIG. 4A further illustrates a field of view 452 of the image capturing apparatus 246. It is appreciated that in FIG. 4A, the retrieval assembly 224 is not precisely aligned with the storage slot 218.

Returning back to FIG. 3, at step 306, the control system analyzes and/or evaluates the image captured toward the storage slot with the first target and the second target shown within the field of view of the image capturing apparatus, and calculates an offset of the first target that is coupled to the retrieval assembly relative to the second target that is coupled to the storage slot. In some embodiments, the offset can be calculated in terms of pixels and/or millimeters. It is appreciated that the calculated offset of the first target relative to the second target may be along one or more axes. For example, the calculated offset can be along the X-axis (such as a horizontal offset) and/or along the Y-axis (such as a vertical offset). It is further appreciated that if or when there is no calculated offset (a zero offset), with the first target substantially overlapping the second target within the field of view of the image capturing apparatus, then the retrieval assembly can be considered to be accurately aligned with the storage slot so the retrieval assembly can accurately retrieve the particular media cartridge from within the specific storage slot.

Figure 4B:
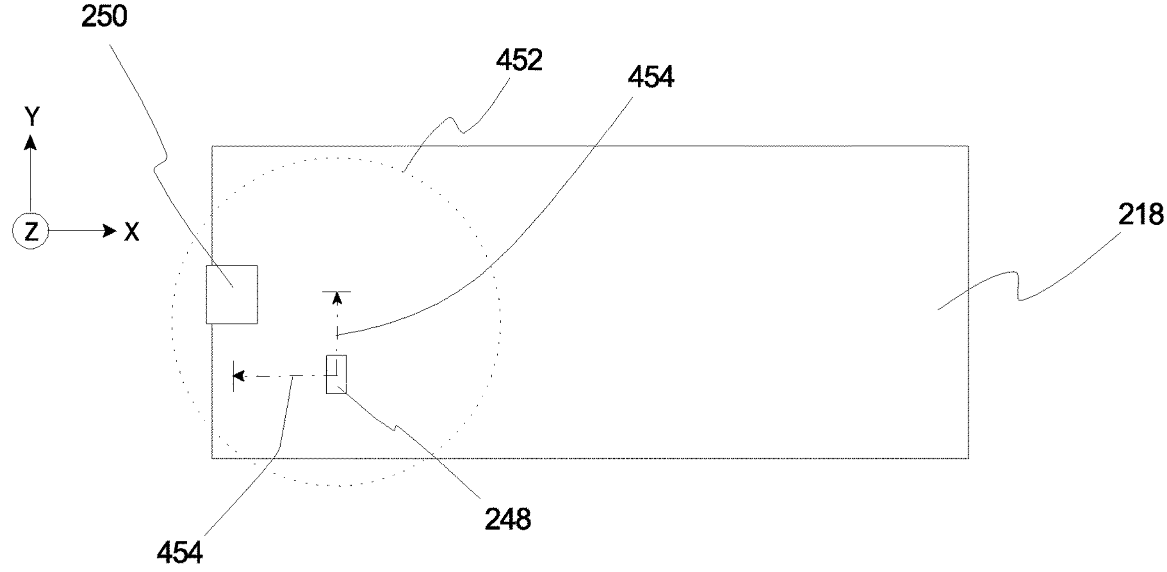
FIG. 4B is a simplified schematic front view illustration of the storage slot illustrated in FIG. 4A, which further illustrates the field of view of the image capturing apparatus, and with the first target being positioned offset relative to the second target within the field of view along one or more axes.

Referring now to FIG. 4B, FIG. 4B is a simplified schematic front view illustration of the storage slot 218 illustrated in FIG. 4A, which further illustrates the field of view 452 of the image capturing apparatus 246 (illustrated in FIG. 4A), and with the first target 248 being positioned offset relative to the second target 250 within the field of view 452 along one or more axes. As illustrated in FIG. 4B, the first target 248 is positioned offset from the second target 250 within the field of view 452 of the image capturing apparatus 246 along both the X-axis and the Y-axis. The system controller 260 (illustrated in FIG. 2A) and/or the library control system 30 (illustrated in FIG. 1), individually or collectively referred to as the "control system", calculate an offset 454 along the axes.

It is appreciated that because the image capturing apparatus 246 is statically coupled to the retrieval assembly 224, there is a consistent distance of the image capturing apparatus 246 relative to the storage slot 218 along the Z-axis. Thus, the distance along the Z-axis between the first target 248 and the second target 250 is considered to be known. With any offset along the Z-axis thus known, such understanding can be used as part of the process utilized by the control system 30, 260 to calculate the offset 454 along the X-axis and/or along the Y-axis.

It is further appreciated that the X-axis, the Y-axis, and the Z-axis as illustrated in FIG. 4B are all perpendicular and/or orthogonal to one another. It is also appreciated that the axes can alternatively be referred to as a "first axis", a "second axis", and a "third axis".

Returning again to FIG. 3, at step 307, the control system precisely controls and moves the retrieval assembly based on the calculated offset so that the first target substantially overlaps the second target within the field of view of the image capturing apparatus. It is appreciated that the first target substantially or sufficiently overlapping the second target within the field of view of the image capturing apparatus, such that the retrieval assembly is considered to be accurately aligned with the storage slot, can be determined within pre-established alignment tolerances. For example, as noted above, the first target being said to "substantially" or "sufficiently" overlap the second target within the field of view can be within between approximately 0.01 millimeters and 0.1 millimeters.

As noted above, in certain embodiments, data or information relevant to the necessary repositioning of the retrieval assembly relative to the particular storage slot for purposes of establishing accurate alignment of the retrieval assembly relative to the particular storage slot can be saved by the control system so that the retrieval assembly can more quickly be sufficiently precisely aligned relative to the particular storage slot in any future uses of the particular storage slot. More particularly, data or information relevant to the specific repositioning of the retrieval assembly relative to the particular storage slot can be incorporated into "Updated Loading/Positioning Instructions" that can be saved by the control system for future uses of the particular storage slot. It is further appreciated that the "Updated Loading/Positioning Instructions" can be further updated and saved by the control system during future uses of the particular storage slot on an as needed basis.

Figure 5A:
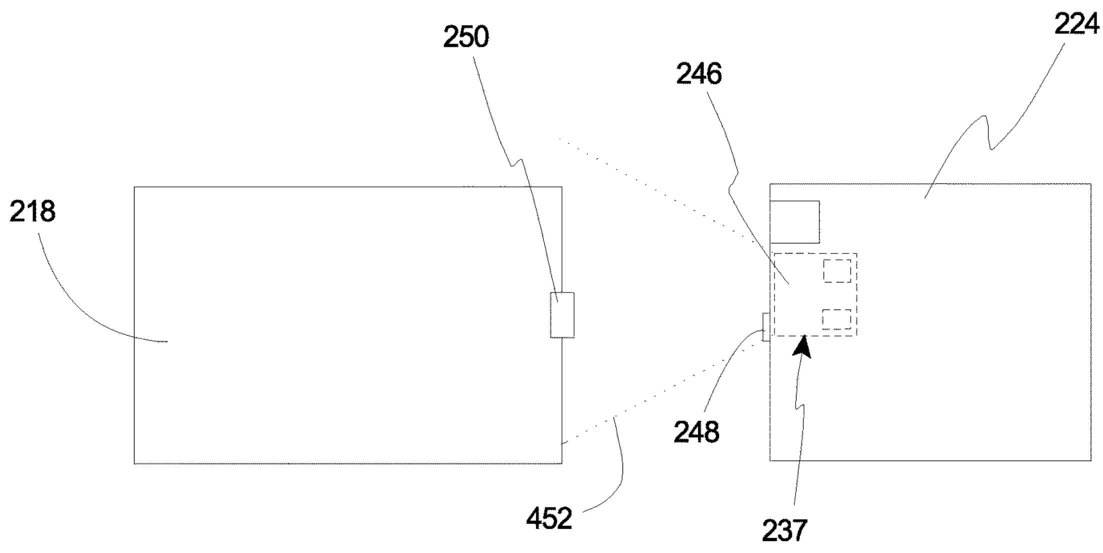
FIG. 5A is another simplified schematic side view illustration of the retrieval assembly having the image capturing apparatus coupled therein and the first target coupled thereto, and the storage slot with the second target coupled thereto, as illustrated in FIG. 2A, which further illustrates the field of view of the image capturing apparatus, and with the retrieval assembly being aligned with the storage slot.

Referring now to FIG. 5A, FIG. 5A is another simplified schematic side view illustration of the retrieval assembly 224 having the image capturing apparatus 246 coupled therein and the first target 248 coupled thereto, and the storage slot 218 with the second target 250 coupled thereto, as illustrated in FIG. 2A, that are included as part of the retriever alignment system 237. As shown, FIG. 5A again further illustrates the field of view 452 of the image capturing apparatus 246. However, at this time, the retrieval assembly 224 is now sufficiently precisely aligned with the storage slot 218.

Figure 5B:
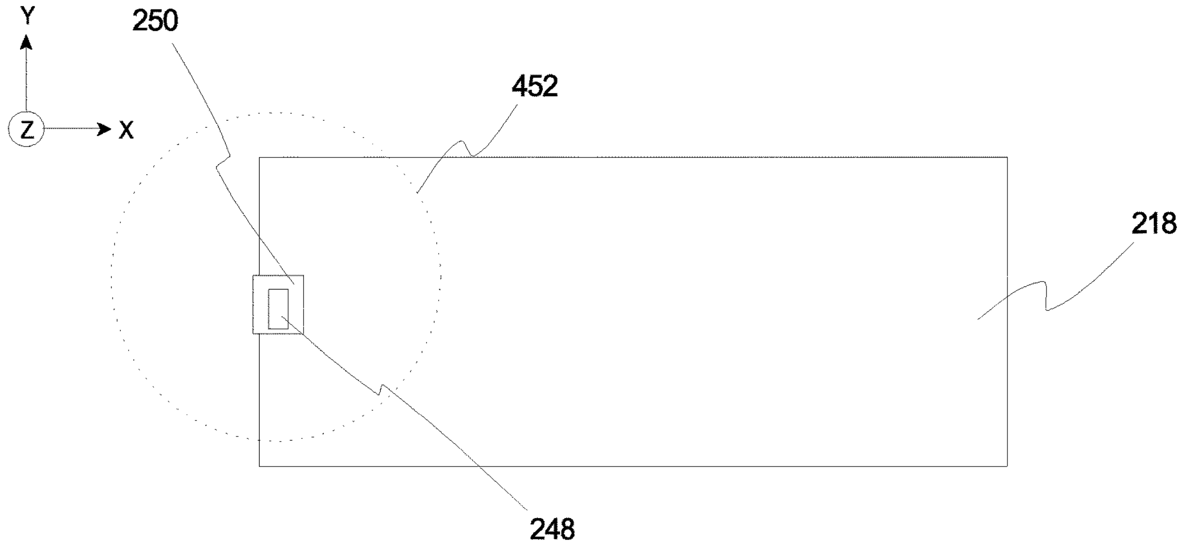
FIG. 5B is another simplified schematic front view illustration of the storage slot illustrated in FIG. 5A, which further illustrates the field of view of the image capturing apparatus, and with the first target being aligned relative to the second target within the field of view along the one or more axes.

FIG. 5B is another simplified schematic front view illustration of the storage slot 218 illustrated in FIG. 5A, which further illustrates the field of view 452 of the image capturing apparatus 246 (illustrated in FIG. 5A), and with the first target 248 being aligned relative to the second target 250 within the field of view 452 along the one or more axes. In particular, the retrieval assembly 224 (illustrated in FIG. 5A) has been moved relative to the storage slot 218 such that there is no longer an offset 454 (illustrated in FIG. 4B) between the first target 248 and the second target 250 along the X-axis and/or the Y-axis. It is appreciated that there being "no offset" between the first target 248 and the second target 250 along the X-axis and/or the Y-axis signifies that the targets 248, 250 are positioned relative to one another within the field of view 452 within the pre-established alignment tolerances.

Alternatively, in another embodiment, accurate alignment can be determined when the first target 248 and second target 250 have a predetermined desired offset within the field of view 452 of the image capturing apparatus 246. Stated in another manner, in such alternative embodiment, the control system can be configured to move the retrieval assembly 224 relative to the storage slot 218 to achieve the predetermined desired offset between the first target 248 and the second target 250 within the field of view 452 so as to ensure proper and accurate alignment of the retrieval assembly 224 relative to the storage slot 218.

Returning again to FIG. 3, at step 308, once the retrieval assembly is accurately aligned relative to the storage slot (with the first target substantially overlapping the second target within the field of view of the image capturing apparatus), picker arms of the retrieval assembly are moved under control of the control system toward the storage slot to accurately and effectively retrieve the media cartridge from within the storage slot.

Figure 6:
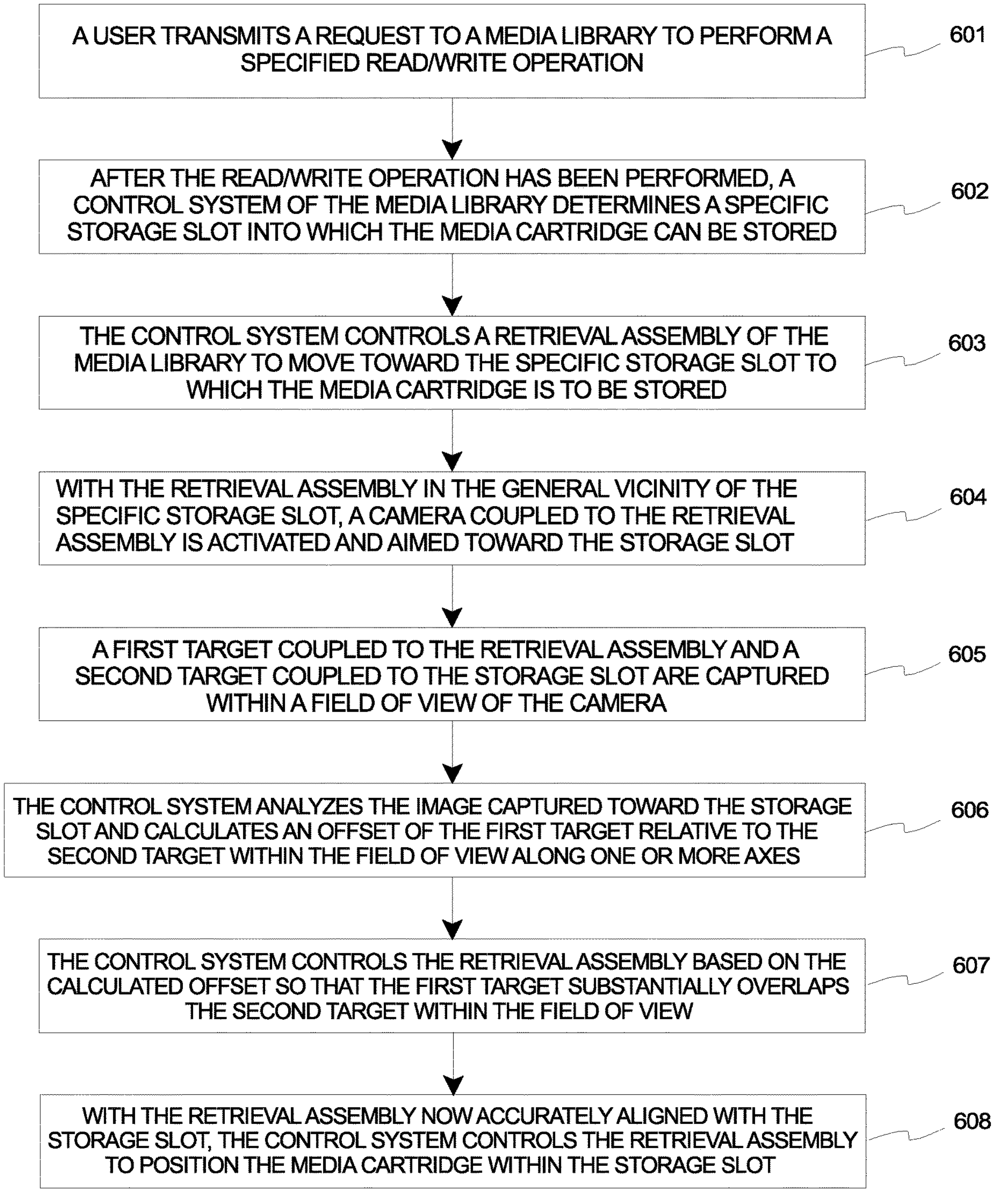
FIG. 6 is a flowchart that illustrates a method for utilizing the retriever alignment system as illustrated in FIG. 2A for ensuring desired accuracy in utilizing the retrieval assembly to position a media cartridge within the storage slot.

Referring now to FIG. 6, FIG. 6 is a flowchart that illustrates a system and method for utilizing the retriever alignment system as illustrated in FIG. 2A for ensuring desired accuracy in utilizing the retrieval assembly to position a media cartridge within the storage slot. It is recognized that in nonexclusive alternative embodiments, the system and method of FIG. 6 can include additional steps other than those specifically delineated herein or can omit certain of the steps that are specifically delineated herein. Moreover, in some embodiments, the order of the steps described below can be modified and/or certain steps can be combined without deviating from the spirit of the present invention.

At step 601, a user transmits a request to a media library, such as via a host application, to perform a certain specified read/write operation. A retrieval assembly of the media library is used, such as via the system and method described in relation to FIG. 3, to retrieve a particular media cartridge from a specific storage slot, and then is used to move the particular media cartridge to a media drive of the media library for purposes of performing the specified read/write operation.

At step 602, after the specified read/write operation has been performed within a media drive of the media library, a control system of the media library determines a specific storage slot in the media library into which the particular media cartridge can now be returned and/or stored. As described herein, the control system can incorporate the library control system 30 (illustrated in FIG. 1) and/or the system controller 260 (illustrated in FIG. 2A).

At step 603, the control system controls the retrieval assembly of the media library to move toward the specific storage slot in the media library into which the particular media cartridge is to be returned and stored. It is appreciated that moving the retrieval assembly toward the specific storage slot under initial control of the control system will move the retrieval assembly to fairly close to where the retrieval assembly needs to be in order to accurately position the particular media cartridge within the specific storage slot. However, as noted above, the initial movement and positioning of the retrieval assembly is unlikely to have the retrieval assembly substantially precisely aligned relative to the specific storage slot that the retrieval assembly can accurately position the particular media cartridge within the specific storage slot. For example, in many embodiments, the initial positioning of the retrieval assembly relative to the storage slot will typically be within approximately 0.5 millimeters from precise alignment along one or more axes.

At step 604, with the retrieval assembly being in the general vicinity of the specific storage slot, an image capturing apparatus (such as a camera or other suitable image capturing apparatus) that is coupled to and/or positioned or embedded within the retrieval assembly is activated by the control system and aimed toward the specific storage slot.

At step 605, a first target that is coupled to the retrieval assembly and a second target that is coupled to the specific storage slot are captured within a field of view of the image capturing apparatus as the image capturing apparatus is aimed toward the specific storage slot. As stated in relation to step 603, it is appreciated that at this point the retrieval assembly may not be precisely aligned with the specific storage slot such that the first target substantially overlaps the second target within the field of view of the image capturing apparatus in such a manner where the retrieval assembly can accurately position the particular media cartridge within the specific storage slot.

At step 606, the control system analyzes and/or evaluates the image captured toward the storage slot with the first target and the second target shown within the field of view of the image capturing apparatus, and calculates an offset of the first target relative to the second target within the field of view of the image capturing apparatus. In some embodiments, the offset can be calculated in terms of pixels and/or millimeters. It is appreciated that the calculated offset of the first target relative to the second target may be along one or more axes. For example, the calculated offset can be along the X-axis (such as a horizontal offset) and/or along the Y-axis (such as a vertical offset). It is further appreciated that if or when there is no calculated offset (a zero offset), with the first target substantially overlapping the second target within the field of view of the image capturing apparatus, then the retrieval assembly can be considered to be accurately aligned with the storage slot so the retrieval assembly can accurately position the particular media cartridge within the specific storage slot.

At step 607, the control system precisely controls and moves the retrieval assembly based on the calculated offset so that the first target substantially overlaps the second target within the field of view of the image capturing apparatus. It is appreciated that the first target substantially or sufficiently overlapping the second target within the field of view of the image capturing apparatus, such that the retrieval assembly is considered to be accurately aligned with the storage slot, can be determined within pre-established alignment tolerances. For example, as noted above, the first target being said to "substantially" or "sufficiently" overlap the second target within the field of view can be within between approximately 0.01 millimeters and 0.1 millimeters.

As above, in certain embodiments, data or information relevant to the necessary repositioning of the retrieval assembly relative to the particular storage slot for purposes of establishing accurate alignment of the retrieval assembly relative to the particular storage slot can again be saved by the control system so that the retrieval assembly can more quickly be sufficiently precisely aligned relative to the particular storage slot in any future uses of the particular storage slot.

At step 608, once the retrieval assembly is accurately aligned relative to the storage slot (with the first target substantially overlapping the second target within the field of view of the image capturing apparatus), picker arms of the retrieval assembly are moved under control of the control system toward the storage slot to accurately and effectively position the media cartridge within the storage slot.

It is understood that although a number of different embodiments of the media library and/or the retriever alignment system have been illustrated and described herein, one or more features of any one embodiment can be combined with one or more features of one or more of the other embodiments, provided that such combination satisfies the intent of the present invention.

While a number of exemplary aspects and embodiments of the media library and/or the retriever alignment system have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A media library, comprising:
- a storage slot that is configured to receive and retain a media cartridge;
- a first target that is coupled to the storage slot;
- a retrieval assembly that is configured to move the media cartridge into and out of the storage slot, the retrieval assembly including an assembly body, an image capturing apparatus that is coupled to the assembly body, and a second target that is coupled to the assembly body;
- a control system including a processor that is configured to control operation of the retrieval assembly by:
  - when the retrieval assembly is positioned such that the first target and the second target are both in a field of view of the image capturing apparatus, causing the image capturing apparatus to capture at least one image having both the first target and the second target; and
  - determining, using the at least one image, an offset between the first target and the second target; and
  - causing the retrieval assembly to move based on the determined offset between the first target and the second target; and
- a lighting system that is coupled to the assembly body of the retrieval assembly, wherein the lighting system is configured to illuminate at least the first target and the second target within the field of view of the image capturing apparatus.

2. The media library of claim 1, wherein determining the offset between the first target and the second target comprises determining the offset along two axes.

3. The media library of claim 1, wherein causing the retrieval apparatus to move comprises causing the retrieval assembly to move relative to the storage slot based on the determined offset so that the first target substantially overlaps the second target within the field of view of the image capturing apparatus.

4. The media library of claim 3, wherein causing the retrieval apparatus to move causes the retrieval assembly to align with the storage slot when the first target substantially overlaps the second target within the field of view of the image capturing apparatus so the retrieval assembly can position the media cartridge within the storage slot.

5. The media library of claim 3, wherein causing the retrieval apparatus to move causes the retrieval assembly to align with the storage slot when the first target substantially overlaps the second target within the field of view of the image capturing apparatus so the retrieval assembly can retrieve the media cartridge from within the storage slot.

6. The media library of claim 3, wherein the control system is configured to save data indicating where the retrieval assembly has been moved relative to the storage slot so that the first target substantially overlaps the second target within the field of view of the image capturing apparatus.

7. The media library of claim 1, wherein the control system is coupled to the assembly body of the retrieval assembly.

8. The media library of claim 7, wherein the image capturing apparatus and the control system are within the assembly body of the retrieval assembly.

9. The media library of claim 1, further comprising: a media drive configured to write data to and/or read data from storage media retained within the media cartridge, wherein the retrieval assembly is configured to move the media cartridge between the storage slot and the media drive.

10. The media library of claim 1, further comprising: a library housing; and a plurality of storage slots that are each configured to receive and retain at least one of a plurality of media cartridges, wherein the plurality of storage slots are incorporated within a magazine, and wherein the magazine can be selectively moved into and out of the library housing.

* * * * *